United States Patent
Chen et al.

(10) Patent No.: US 6,476,126 B1
(45) Date of Patent: Nov. 5, 2002

(54) WEATHERABLE MOLDING COMPOSITION HAVING IMPROVED SURFACE APPEARANCE

(75) Inventors: Chuan-Ju Chen, Amherst, MA (US); Mitchell J. Sierodzinski, Springfield, MA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/420,936

(22) Filed: Oct. 19, 1999

Related U.S. Application Data

(63) Continuation-in-part of application No. 09/287,790, filed on Apr. 7, 1999, now abandoned.

(51) Int. Cl.⁷ ............................................. C08L 69/00
(52) U.S. Cl. ......................... 525/67; 525/309; 525/902
(58) Field of Search ........................... 525/67, 309, 902

(56) References Cited

U.S. PATENT DOCUMENTS

| | | | |
|---|---|---|---|
| 3,055,859 A | 9/1962 | Vollmert | 260/45.5 |
| 3,655,824 A | 4/1972 | Kato et al. | 260/873 |
| 3,691,260 A | 9/1972 | Mittnacht et al. | 260/876 R |
| 3,891,719 A | 6/1975 | Schirmer et al. | 260/873 |
| 4,148,842 A | 4/1979 | Yu et al. | 260/873 |
| 6,111,012 A | * 8/2000 | Fischer | |

FOREIGN PATENT DOCUMENTS

| | | |
|---|---|---|
| EP | 465792 | 1/1992 |
| EP | 0 534 212 | 12/1995 |
| GB | 1124911 | 8/1968 |
| JP | 50-154349 | 12/1975 |
| JP | 026646 | * 2/1986 |

* cited by examiner

Primary Examiner—David J. Buttner
(74) Attorney, Agent, or Firm—Joseph C. Gil; Aron Preis

(57) ABSTRACT

A thermoplastic molding composition which features improved surface appearance is disclosed. The composition contains a blend of (A) a grafted rubber comprising a crosslinked rubber substrate which contains a styrenic core and an acrylate rubber shell, to which grafted is a grafted phase, and (B) a copolymeric matrix containing a copolymer such as styrene/acrylonitrile, and (C) an aromatic (co) polycarbonate resin. The composition is useful in the preparation of molded articles which are characterized in having low haze, high gloss and the absence of corona defect.

14 Claims, No Drawings

WEATHERABLE MOLDING COMPOSITION HAVING IMPROVED SURFACE APPEARANCE

This application is a Continuation-In-Part of U.S. Ser. No. 09/287,790, filed Apr. 7, 1999 now abandoned.

The invention concerns a thermoplastic molding composition containing polycarbonate and a grafted rubber; more particularly, the grafted rubber of the inventive composition contains a core/shell substrate.

SUMMARY OF THE INVENTION

A thermoplastic molding composition useful in the preparation of molded articles is disclosed. The composition contains a blend of
(A) a grafted rubber comprising a crosslinked rubber substrate which contains
  (A1) a vinylaromatic polymer core and
  (A2) an acrylate rubber shell, to which substrate is grafted
  (A3) a grafted phase,
(B) a copolymeric matrix, and
(C) (co)polycarbonate resin.

Preferably containing no additional grafted rubber components, the composition is suitable for preparing articles having low haze, high gloss and which are free of corona defect.

BACKGROUND OF THE INVENTION

It has long been known that styrene/acrylonitrile copolymers (SAN) may be imparted improved impact properties by the incorporation of rubbers. In ABS polymers, diene polymers are used as the rubbers for toughening, most notably at low temperatures; however, the relatively poor weathering and aging resistance make these materials less favored in more demanding applications. In some such applications, use has successfully been made of crosslinked acrylic acid ester polymers; these are the well-known ASA copolymers. Such have been described in U.S. Pat. No. 3,055,859 and in German Patents 1,260,135 and 1,911,882 Accordingly, the preferably crosslinked, rubbery acrylic acid ester polymer which serves as the grafting base (substrate) may be prepared by emulsion polymerization and the latex thus prepared may then be grafted, preferably by emulsion, with a mixture of styrene and acrylonitrile. The art thus has long recognized that improved impact strength, notched Izod and greater hardness are associated with such ASA products which have as a grafting base a coarse polyacrylate latex.

The art refers to "hard" and "soft" segments in terms of the relative position of their glass transition temperature vis a vis room temperature. "Hard" means $T_g$ above room temperature and "soft" means below room temperature, as well as to core/shell structures including structures which contain a multiplicity of shells. Multi-phase structured emulsion copolymers, including hard-soft and hard morphologies have been disclosed in EP 534,212 and in the documents referenced therein. Accordingly, graft copolymers with a hard core of polystyrene, a first butyl acrylate shell and an outer SAN shell have been disclosed in the art.

The relevant art also includes U.S. Pat. No. 4,148,842 which disclosed an impact resistant blend containing polycarbonate resin and an interpolymer modifier comprising a crosslinked (meth)acrylate, crosslinked SAN and uncrosslinked SAN components. Compositions containing polycarbonate and ASA graft polymer and the methods for their preparation were disclosed in U.S. Pat. No. 3,655,824 and in U.S. Pat. No. 3,891,719. Compositions containing polycarbonate, ASA and PMMA were disclosed in U.S. Pat. No. 4,579,909. JP 50154349 disclosed flame retardant compositions containing PC and ASA.

DETAILED DESCRIPTION OF THE INVENTION

The inventive thermoplastic composition is suitable for the preparation of molded articles having low haze, high gloss characterized in the absence of corona surface defects. The composition comprises a blend of 10 to 50 percent by weight (wt. %), preferably 20 to 40 wt. % of grafted rubber (A), 0 to 40, preferably 10 to 30, wt. % of a copolymeric matrix (B), and 10 to 90, preferably 30 to 70, wt. % of (co)polycarbonate resin (C). More specifically, (A) denotes a grafted rubber comprising 30 to 80 percent, preferably 40 to 70 percent, relative to its weight, of a crosslinked rubber substrate which contains (A1) about 1 to 50%, relative to the weight of the substrate, of a core which contains at least one vinylaromatic polymer, and (A2) about 50 to 99%, relative to the weight of the substrate of a shell containing at least one polymerized acrylate, to which rubber substrate is grafted (A3) 70 to 20 percent, preferably 60 to 30 percent, relative to the weight of the grafted rubber, of a grafted phase. The inventive composition may include poly(alkyl) methacrylate, preferably poly(methyl)methacrylate, (PMMA) as an additional component, (D).

The composition, which in a preferred embodiment contains no other grafted rubber components, is characterized in that the particle size, weight average particle size, of the grafted rubber, is about 0.1 to 1.0 microns, preferably 0.1 to 0.6 microns. The grafted rubber may feature a bimodal size distribution of its rubber particles. In relevant embodiments, the particles of the "small mode" would have a weight average particle size in the range of 0.05 to 0.3, preferably 0.1 to 0.25 microns; the particles of the "large mode" would have a weight average particle size of 0.31 to 1.0, preferably 0.35 to 0.6 microns.

The substrate contains 1 to 50, preferably 3 to 40, percent relative to the weight of the substrate, of a core (A1) and 99 to 50, preferably 97 to 60, percent relative to the weight of the substrate of a shell (A2) where (A1) denotes an optionally crosslinked core polymerized from at least one member selected from the group consisting of styrene, α-methyl styrene, ring-halogenated styrene and ring-alkylated styrene, and where (A2) denotes a shell enveloping said core comprising crosslinked $C_{1-18}$-alkyl acrylate rubber, preferably $C_{2-8}$-alkyl acrylate rubber, said substrate being present in particulate form having a size (weight average particle size) of about 0.05 to 1.0, preferably 0.1 to 0.6 microns.

The grafted phase (A3) contains a copolymer of at least one monomer selected from a first group consisting of styrene, α-methyl styrene, ring-halogenated styrene and ring-alkylated styrene, such as p-methylstyrene and tert.butylstyrene with at least one monomer selected from a second group consisting of (meth)acrylonitrile, methylmethacrylate and maleic anhydride. The weight ratio between said monomer(s) of said first group to said monomer(s) of said second group of 85:15 to about 65:35.

The inventive composition preferably contains no additional grafted rubber components.

The composition according to the invention may contain conventional additives, in customary and effective amounts, which are known for their utility in thermoplastic elastomeric molding compositions.

The grafted rubber, component (A) of the inventive composition, may be prepared by graft copolymerization of at least one of styrene, α-methyl styrene, ring halogenated styrene, ring-alkylated styrene, such as p-methylstyrene and tert.butylstyrene with at least one of (meth)acrylonitrile, methylmethacrylate and maleic anhydride in the presence of the crosslinked, elastomeric core-shell substrate. Since 100% grafting yield cannot be achieved in the graft copolymerization, the polymerization product from the graft copolymerization always contains a proportion of free, non-grafted copolymer (for convenience, the grafted phase is referred to hereinafter in this text as "SAN"). However, for the purposes of the present invention, the term "graft copolymer" is only applied to the rubber to which SAN have actually been grafted. The proportion of the grafted SAN in the polymerization product from the graft copolymerization can be determined in the conventional manner by extracting the free, non-grafted SAN copolymer from the polymerization product, for example, by methyl ethyl ketone, since the grafting base of the grafted rubber is crosslinked and the grafted copolymer is chemically bound to the graft base. The principles of the method of separation have been described by Moore, Moyer and Frazer, Appl. Polymer Symposia No. 7, page 67, et seq. (1968).

The degree of grafting, in the present context, refers to the percentage proportion, based on the total graft copolymer, of the SAN which is chemically bonded in the grafting branches of the graft copolymer. The degree of grafting may be calculated from the analytically determined composition of the gel which is insoluble in methyl ethyl ketone.

The particle size according to the invention is the weight-average particle size as determined by an ultracentrifuge, such as in accordance with the method of W. Scholtan and H. Lange, Kolloid-Z. und Z.-Polymere 250 (1972), 782–796. The ultracentrifuge measurement gives the integral mass distribution of the particle diameters of a sample. From this, it is possible to determine that the percentage by weight of the particles have a diameter equal to or less than a certain size.

The graft rubber useful according to the invention, namely component (A), may be prepared in the conventional manner by methods which are well known in the art. The core polymer (A1) which is optionally crosslinked, may be prepared by conventional emulsion techniques which are well known in the art. The monomers to be employed are at least one member selected from the group consisting of styrene, α-methyl styrene, ring-halogenated styrene and ring-alkylated styrene, such as p-methylstyrene and tert.butylstyrene. Crosslinking may be attained by the incorporation of small amounts, usually about 0.5 to 10%, preferably 0.5 to 3%, relative to the weight of the core, of any of the polyfunctional monomeric cross-linking agents, which are well known in the art. Examples include tri allyl cyanurate, di allyl maleate and di vinyl benzene.

The rubber shell (A2) is crosslinked $C_{1-18}$-alkyl acrylate rubber, preferably $C_{2-8}$-alkyl acrylate rubber, which may optionally contain units derived from $C_{1-6}$-alkylmethacrylate. Preferably, the shell is characterized in that its glass transition temperature is below 0° C., preferably below −20° C. The glass transition temperature of the acrylic acid ester polymer may be determined by the DSC method (K. H. Illers, Makromol. Chemie 127 (1969), page 1). Specific examples are n-butyl acrylate and 2-ethylhexyl acrylate. The acrylic acid esters may be employed as individual compounds or as mixtures with one another. In the preparation of the substrate, the acrylic acid esters (or the other monomers making up the shell) are polymerized in the presence of the previously prepared core polymer (A1).

In order to obtain crosslinking of the preferred acrylic polymers, the polymerization is preferably carried out in the presence of from 0.5 to 10% by weight, preferably from 0.5 to 3% by weight, based on the total monomers employed for the preparation of the grafting bases, of a copolymerizable, polyfunctional, preferably trifunctional, monomer which effects crosslinking and subsequent grafting. Suitable difunctional or polyfunctional crosslinking monomers are those which contain two or more, preferably three, ethylenic double bonds which are capable of copolymerization and are not conjugated in the 1,3-positions. Examples of suitable crosslinking monomers are divinylbenzene, diallyl maleate, diallyl fumarate and diallyl phthalate, and triallyl cyanurate and triallyl isocyanurate. Grafting agents may optionally be included, including unsaturated monomers having epoxy, hydroxy, carboxyl, and amino or acid anhydride groups, for example hydroxyalkyl (meth)acrylates.

The preparation of the graft copolymer (A) to be employed according to the invention may be carried out in accordance with the following method. The vinyl aromatic core particle (A1) is first prepared by polymerizing the vinyl aromatic monomer(s) to form a core particle (optionally, crosslinked) in aqueous emulsion by conventional methods at from 20 to 100° C., preferably from 50 to 90° C. The conventional emulsifiers, for example alkali metal salts of alkyl sulfonic acids or alkyl aryl sulfonic acids, alkyl sulfates, fatty alcohol sulfonates, salts of higher fatty acids of 10 to 30 carbon atoms, or resin soaps, may be used. The sodium salts of alkyl sulfonic acids or the sodium salts of fatty acids of from 10 to 18 carbon atoms are preferred. Advantageously, the emulsifier is used in an amount of from 0 to 5% by weight, especially from 0 to 2% by weight, based on the monomer(s) employed to prepare the core polymer (A1). In general, water-to-monomer ratio of from 50:1 to 0.7:1 is used. The polymerization initiators used are in particular the conventional persulfates, e.g., potassium persulfate, but redox systems can also be employed. In general, the initiator is used in an amount of from 0.1 to 1% by weight, based on the monomer(s) employed in the preparation of the core polymer (A1). Further polymerization additives which may be employed are the conventional buffers, to bring the pH to about 6 to 9, for example, sodium bicarbonate and sodium pyrophosphate, and from 0 to 3% by weight of a molecular weight regulator, for example, a mercaptan terpinol, or dimeric alpha-methyl styrene.

The precise polymerization conditions, such as the nature, rate of addition, and amount of the emulsifier initiator, and other additives, are selected, within the ranges referred to above so that the resulting latex of the optionally crosslinked vinyl aromatic core polymer attains the indicated particle size.

The preparation of the crosslinked rubber shell (A2) in the presence of the polyvinyl aromatic core particle to form the substrate according to the invention may be carried out in accordance with the following method. The shell (A2) is prepared by polymerizing the indicated monomers, for instance, acrylic acid ester or esters, and the polyfunctional crosslinking-/graftlinking monomer, in aqueous emulsion by conventional methods at from 20 to 100° C., preferably from 50 to 80° C. The conventional emulsifiers, for example alkali metal salts of alkyl sulfonic acids or alkyl aryl sulfonic acids, alkyl sulfates, fatty alcohol sulfonates, salts of higher fatty acids of 10 to 30 carbon atoms, or resin soaps, may be used. The sodium salts of alkyl sulfonic acids or the sodium salts of fatty acids of from 10 to 18 carbon atoms are preferred. Advantageously, the emulsifier is used in an amount of from 0 to 5% by weight, especially from 0 to 2% by weight, based on the monomer(s) employed to prepare the crosslinked shell (A2). In general, water-to-monomer ratio of from 5:1 to 0.7:1 is used. The polymerization initiators used are in particular the conventional persulfates, e.g., potassium persulfate, but redox systems can also be employed. In general, the initiator is used in an amount of from 0.1 to 1% by weight, based on the monomer(s) employed in the preparation of the crosslinked shell (A2). Further polymerization additives which may be employed are the conventional buffers, to bring the pH to about 6 to 9, for example, sodium bicarbonate and sodium pyrophosphate, and from 0 to 3% by weight of a molecular weight regulator, for example, a mercaptan, terpinol, or dimeric alpha-methyl styrene.

The precise polymerization conditions, such as, the nature, rate of addition, and amount of the emulsifier initiator, and other additives, are selected, within the ranges referred to above, so that the resulting latex of the substrate attains the particle size required in accordance with the present invention.

To prepare the grafted rubber (A), a monomer system containing at least one monomer selected from a first group consisting of styrene, α-methyl styrene, ring-alkylated styrene, such as, p-methylstyrene and tert.butylstyrene with at least one monomer selected from a second group consisting of (meth)acrylonitrile, methylmethacrylate and maleic anhydride is polymerized in the presence of the latex of crosslinked rubber, preferably acrylic acid ester polymer which contains about 1 to 50 percent relative to its weight of a polymer of vinyl aromatic monomer, preferably, styrene. The weight ratio between the monomer of said first group to said monomer of said second group is 85:15 to about 65:35.

It is advantageous if this graft copolymerization of the grafted phase onto the crosslinked rubber substrate is carried out in aqueous emulsion under the conventional conditions. The graft copolymerization may advantageously be carried out in the same system as the emulsion polymerization which is used to prepare the substrate, optionally with the further addition of emulsifier and initiator. The monomer system to be grafted onto the base can be added to the reaction mixture all at once, in several stages or, preferably, continuously during the polymerization. The graft copolymerization of the mixture onto the crosslinked rubber substrate is conducted such that a degree of grafting of 10 to 50% by weight, preferably 20 to 40% by weight, in the grafted rubber (A) results. Since the grafting yield of the graft copolymerization is not 100%, it is necessary to employ a somewhat larger amount of the monomer mixture for the graft copolymerization than would correspond to the desired degree of grafting. The control of the grafting yield of the graft copolymerization, and hence the degree of grafting of the finished grafted rubber (A) is familiar to the art-skilled and is effected, inter alia, by the rate of addition of the monomers and by adding a molecular chain regulator (Chauvel and Daniel, ACS Polymer Preprints 15 (1974), 329 et seq.).

The grafted phase in the grafted rubber (A) along with the non-grafted (free) polymer produced in the emulsion polymerization is recovered as dry solids from the liquid latex by the usual coagulation, washing, dewatering and drying techniques.

As discussed above, the composition in accordance with the invention contains a matrix (B) which includes a copolymer of at least one monomer selected from a first group consisting of styrene, α-methyl styrene, ring-halogenated styrene and ring-alkylated styrene and at least one monomer selected from a second group consisting of (meth) acrylonitrile, methyl methacrylate and maleic anhydride. The weight ratio between said monomer(s) of said first group to said monomer(s) of said second group is 85:15 to about 65:35. The free, non-grafted copolymer formed during the graft copolymerization for the preparation of the component (A) may also form part of the hard component (B). Depending on the conditions selected for the graft copolymerization to prepare the grafted rubber (A), it may be that a sufficient proportion of hard component (B) has already been formed during the graft copolymerization. In general, however, it is necessary to mix the products obtained from the graft copolymerization with additional, separately prepared hard component (B). This additional, separately prepared hard component (B) is preferably a styrene/acrylonitrile copolymer, a α-methyl styrene/acrylonitrile copolymer or a α-methyl styrene/styrenelacrylonitle terpolymer. These copolymers can be employed individually, or as mixtures with one another, as the hard component, so that the additional separately prepared hard component (B) of the composition according to the invention can be, for example, a mixture of a styrene/acrylonitrile copolymer and a α-methyl styrene/acrylonitrile copolymer. The hard component (B) may be obtained by conventional methods. Thus, the copolymerization of styrene and/or α-methyl styrene with acrylonitrile can be carried out by radical polymerization, preferably, mass polymerization, solution polymerization, suspension polymerization or aqueous emulsion polymerization.

Suitable polycarbonate resins for preparing the copolymer of the present invention are homopolycarbonates and copolycarbonates and mixtures thereof.

The polycarbonates generally have a weight average molecular weight of 10,000 to 200,000, preferably 20,000 to 80,000 and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", lnterscience Publishers, New York, N.Y., 1964, all incorporated herein by reference).

In the present context, dihydroxy compounds suitable for the preparation of the polycarbonates of the invention conform to the structural formulae (1) or (2).

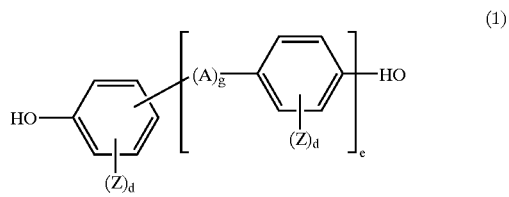

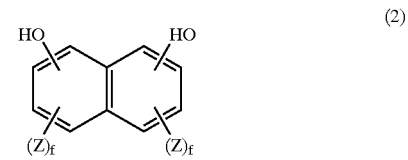

wherein
  A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

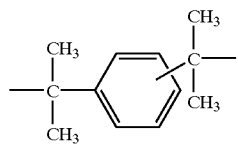

e and g both denote the number 0 to 1;

Z denotes F, Cl, Br or C$_1$–C$_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropyl-benzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention, such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pa.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

The mixing of the components for the preparation of the inventive composition may be carried out conventionally by method and using equipment which are well known in the art.

The composition may contain, as further components, any additive conventionally used, such as fillers, other compatible plastics, antistatic agents, antioxidants, flameproofing agents, lubricants and UV stabilizers. The additives may be used in conventional effective amounts, preferably of from 0.1 to a total of about 30% relative to the total weight of A+B+C.

The examples which follow illustrate the invention. In the examples, parts and percentages are by weight, unless stated otherwise.

EXAMPLES

In the preparation of samples, the grafted rubber components, styrene-acrylonitrile copolymer (SAN), polycarbonate (PC), and the optional poly(methyl)methacrylate (PMMA), and additives having no criticality in the present context, were melt compounded in a twin screw extruder. Test specimens were molded by injection, at about 500 to 520° F. melt temperature, 160 to 180° F. mold temperature and 1.0 to 1.5 inch/second injection rate.

Haze and Gloss were determined on injection molded plaques at 20 degree angle using a BYK Gardner Haze-Gloss Reflectometer according to ASTM D-523 for the Gloss measurements and D4039 for the determination of Haze.

Corona in the present context is a surface defect which appears as a semi-circular ring radiating from the gate of the injection molded plaque. In black-pigmented articles it appears less dark than the rest of the surface.

The specimens for the determination of the Izod impact strength were ⅛" in thickness and the measurements were at 23° C., in accordance with ASTM D-256.

Fractovis impact strength was determined using plaques measuring 1/10" in thickness at 23° C., in accordance with ASTM D-3763: ½" dart, 3" ring and 8000 inch/second rate.

Compositions representative of the invention have been prepared and their properties determined. The results of the determinations are shown in the table below. The components used in the preparation of the compositions are described as follows:

ASA-1: denotes a grafted rubber which is outside the scope of the invention, containing a butyl acrylate substrate and a grafted phase of styrene/acrylonitrile (SAN) where the weight ratio of S/AN is 70/30; the rubber content was 55% and its particle size (weight average) was 0.14 microns.

ASA-2: denotes a grafted rubber which is outside the scope of the invention, containing a butyl acrylate substrate and a grafted phase of styrene/acrylonitrile (SAN) where the weight ratio of S/AN is 65/35; the rubber content was 30% and its particle size (weight average) was 0.05 to 0.1 microns.

ASA-3: denotes a grafted rubber within the scope of the invention, containing a core/shell substrate which contains 25% polystyrene core and 75% polybutylacrylate shell, and a grafted SAN phase where the weight ratio of S/AN is 77.5/22.5; the rubber content was 55% and its particle size (weight average) was 0.18 microns.

ASA-4: denotes a grafted rubber within the scope of the invention, containing a core/shell substrate which contains 5% polystyrene core and 95% polybutylacrylate shell, and a grafted SAN phase where the weight ratio of S/AN is 80/20; the rubber content was 60% and its particle size (weight average) was 0.37 microns.

SAN: denotes a styrene/acrylonitrile copolymer where the weight ratio of S/AN is 70/30.

PMMA: denotes plexiglass V825-100 a product of Rohm & Haas.

Polycarbonate: Makrolon 2600, a homopolycarbonate resin based on bisphenol-A, a product of Bayer Corporation.

The amounts of the individual components are noted in percent by weight.

TABLE

|  | 1 | 2 | 3 | 4 | 5 | 6 | 7 | 8 | 9 |
|---|---|---|---|---|---|---|---|---|---|
| ASA-1 | 25 | 17.5 | | | | | | | |
| ASA-2 | | | | | | | 37 | | |
| ASA-3 | | | 25 | 25 | 17.5 | 17.5 | | 12.5 | |
| ASA-4 | | | | | | | | 12.5 | 25 |
| polycarbonate | 50 | 50 | 50 | 50 | 50 | 50 | 50 | 50 | 50 |
| SAN | 25 | 32.5 | 25 | 20 | 32.5 | 27.5 | 13 | 25 | 25 |
| PMMA | | | | 5 | | 5 | | | |
| Properties |  |  |  |  |  |  |  |  |  |
| Haze, | 190 | 182 | 62 | 54 | 61 | 55 | 130 | 56 | 58 |
| Gloss, | 74 | 74 | 91 | 91 | 92 | 92 | 74 | 92 | 89 |
| Corona[1] | Y | Y | N | N | N | N | Y | S | Y |

TABLE-continued

|  | 1 | 2 | 3 | 4 | 5 | 6 | 7 | 8 | 9 |
|---|---|---|---|---|---|---|---|---|---|
| Impact properties |  |  |  |  |  |  |  |  |  |
| Izod, (J/m) | 502 | 480 | 480 | 459 | 395 | 379 | 486 | 849 | 834 |
| Fractovis, (J) | 39 | 40 | 42 | 41 | 41 | 40 | 41 | 42 | 40 |

[1]Y-denotes the appearance of a coronal defect. N denotes no defect. S denotes slight defect.

The inventive compositions, represented by Examples 3, 4, 5, 6, 8 and 9, exhibit reduced haze and increased gloss. The absence of corona surface defect was noted for Examples 3, 4, 5 and 6. The compositions which contained no core/shell structure as the substrate (Examples 1, 2 and 7) exhibit higher haze, lowered gloss and pronounced corona.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a blend of 10 to 50 wt. % of (A), 0 to 40 wt. % of (B) and 10 to 90 wt. % of (C), where (A) denotes a grafted rubber comprising a crosslinked rubber substrate which contains (A1) about 1 to 50%, relative to the weight of the substrate, of a crosslinked core the crosslinking agent of said core consisting of at least one monomer that contain two or more ethylenic double bonds which are capable of copolymerization and are not conjugated in the 1,3-positions, and (A2) about 50 to 99%, relative to the weight of the substrate of a shell containing at least one polymerized acrylate, to which grafted is (A3) a grafted phase, and where (B) denotes a copolymeric matrix containing a copolymer of at least one monomer selected from a first group consisting of styrene, α-methyl styrene, ring-halogenated styrene and ring-alkylated styrene and at least one monomer selected from a second group consisting of (meth) acrylonitrile, methyl methacrylate and maleic anhydride wherein weight ratio between said monomer of said first group to said monomer of said second group is in the range of 85:15 to about 65:35, and where (C) denotes an aromatic (co)polycarbonate resin, wherein said substrate and said grafted phase relate one to the other, by weight, as 30:70 to 80:20, where (A1) consists of the polymerization product of the crosslinking agent and at least one member selected from the group consisting of styrene, α-methyl styrene, ring-halogenated styrene and ring-alkylated styrene, and where (A2) denotes a crosslinked alkyl acrylate rubber shell enveloping said core, said substrate being present in particulate form having a weight average particle size of about 0.05 to 0.18 microns, and where grafted phase (A3) contains a copolymer of at least one monomer selected from a third group consisting of styrene, α-methyl styrene, ring-halogenated styrene and ring-alkylated styrene with at least one monomer selected from a fourth group consisting of (meth) acrylonitrile, methylmethacrylate and maleic anhydride and wherein weight ratio between said monomer of said third group to monomer of said fourth group is 85:15 to about 65:35 said composition containing no other grafted rubber component.

2. The composition of claim 1 wherein said grafted rubber (A) is present at an amount of 20 to 40 wt. %.

3. The composition of claim 1 wherein said copolymeric matrix (B) is present at an amount of 10 to 30 wt. %.

4. The composition of claim 1 wherein said (co)polycarbonate (C) is present at an amount of 30 to 70 wt. %.

5. The composition of claim 1 wherein said grafted rubber comprise 40 to 70 percent, relative to its weight, of a crosslinked rubber substrate.

6. The composition of claim 1 wherein said polymerization product is polymerized styrene.

7. The composition of claim 1 wherein said shell contains polymerized $C_{1-18}$-alkyl acrylate rubber.

8. A thermoplastic molding composition comprising a blend of 10 to 50 wt. % of (A), 0 to 40 wt. % of (B) and 10 to 90 wt. % of (C), where (A) denotes a grafted rubber comprising a crosslinked rubber substrate which contains (A1) about 1 to 50%, relative to the weight of the substrate, of a crosslinked core the crosslinking agents of said core consisting of at least one monomer that contain two or more ethylenic double bonds which are capable of copolymerization and are not conjugated in the 1,3-positions, and (A2) about 50 to 99%, relative to the weight of the substrate of a shell containing at least one polymerized acrylate, to which grafted is (A3) a grafted phase, and where (B) denotes a copolymeric matrix containing a copolymer of at least one monomer selected from a first group consisting of styrene, α-methyl styrene, ring-halogenated styrene and ring-alkylated styrene and at least one monomer selected from a second group consisting of (meth)acrylonitrile, methyl methacrylate and maleic anhydride wherein weight ratio between said monomer of said first group to said monomer of said second group is in the range of 85:15 to about 65:35, and where (C) denotes an aromatic (co)polycarbonate resin, wherein said substrate and said grafted phase relate one to the other, by weight, as 30:70 to 80:20, where (A1) consists of the polymerization product of the crosslinking agent and at least one member selected from the group consisting of styrene, α-methyl styrene, ring-halogenated styrene and ring-alkylated styrene, and where (A2) denotes a crosslinked alkyl acrylate rubber shell enveloping said core, said substrate being present in particulate form characterized in a bimodal size distribution containing a small mode and a large mode wherein small mode has a weight average particle size of about 0.05 to 0.3 microns, and where the large mode has a weight average particle size of about 0.31 to 1.0 microns and where grafted phase (A3) contains a copolymer of at least one monomer selected from a third group consisting of styrene, α-methyl styrene, ring-halogenated styrene and ring-alkylated styrene with at least one monomer selected from a fourth group consisting of (meth)acrylonitrile, methylmethacrylate and maleic anhydride and wherein weight ratio between said monomer of said third group to monomer of said fourth group is 85:15 to about 65:35.

9. The composition of claim 8 wherein said shell contains polymerized $C_{1-18}$-alkyl acrylate rubber.

10. The composition of claim 8 wherein small mode has a weight average particle size of 0.1 to 0.25 microns and where the weight average particle size of the large mode is 0.35 to 0.6 microns.

11. The composition of claim 8 wherein said grafted rubber (A) is present at an amount of 20 to 40 wt. %.

12. The composition of claim 8 wherein said copolymeric matrix (B) is present at an amount of 10 to 30 wt. %.

13. The composition of claim 8 wherein said (co)polycarbonate (C) is present at an amount of 30 to 70 wt. %.

14. The composition of claim 8 wherein said grafted rubber comprise 40 to 70 percent, relative to its weight, of a crosslinked rubber substrate.

* * * * *